(12) United States Patent
Takeuchi et al.

(10) Patent No.: US 6,961,459 B2
(45) Date of Patent: Nov. 1, 2005

(54) THREE-DIMENSIONAL DATA PROCESSING DEVICE, THREE-DIMENSIONAL DATA PROCESSING METHOD, AND PROGRAM PROVIDING MEDIUM

(75) Inventors: Hideto Takeuchi, Tokyo (JP); Katsushi Ikeuchi, 2-12, Umegoaka Aeba-ku, Yokohama-shi, Kanagawa (JP)

(73) Assignees: Sony Corporation, Tokyo (JP); Katsushi Ikeuchi, Kanagawa (JP)

( * ) Notice: Subject to any disclaimer, the term of this patent is extended or adjusted under 35 U.S.C. 154(b) by 700 days.

(21) Appl. No.: 09/951,664

(22) Filed: Sep. 12, 2001

(65) Prior Publication Data

US 2002/0114509 A1 Aug. 22, 2002

(30) Foreign Application Priority Data

Sep. 12, 2000 (JP) ..................................... P2000-276493

(51) Int. Cl.[7] ........................... G06K 9/00; G06T 15/00
(52) U.S. Cl. ........................ 382/154; 382/285; 345/419; 356/12; 348/42; 359/462; 352/57
(58) Field of Search ................................ 382/154, 285; 345/419–427; 356/12–14; 348/42–60; 359/462–477; 352/57–65; 33/20.4; 353/7–9; 378/41–42; 396/324–331

(56) References Cited

U.S. PATENT DOCUMENTS

| | | | | |
|---|---|---|---|---|
| 4,935,879 A | * | 6/1990 | Ueda | 345/552 |
| 5,187,754 A | * | 2/1993 | Currin et al. | 382/284 |
| 5,611,000 A | * | 3/1997 | Szeliski et al. | 382/294 |
| 5,649,032 A | * | 7/1997 | Burt et al. | 382/284 |
| 6,009,190 A | * | 12/1999 | Szeliski et al. | 382/154 |
| 6,044,168 A | * | 3/2000 | Tuceryan et al. | 382/118 |
| 6,078,701 A | * | 6/2000 | Hsu et al. | 382/294 |
| 6,084,979 A | * | 7/2000 | Kanade et al. | 382/154 |
| 6,434,278 B1 | * | 8/2002 | Hashimoto | 382/285 |
| 6,639,594 B2 | * | 10/2003 | Zhang et al. | 345/426 |
| 6,668,082 B1 | * | 12/2003 | Davison et al. | 382/190 |
| 6,754,379 B2 | * | 6/2004 | Xiong et al. | 382/154 |

* cited by examiner

*Primary Examiner*—Bhavesh M. Mehta
*Assistant Examiner*—Aaron Carter
(74) *Attorney, Agent, or Firm*—Bell, Boyd & Lloyd LLC

(57) ABSTRACT

A plurality of sets of range data and texture data obtained at different visual points are generated with respect to a measuring object, and relative shift processing of the range data is carried out. At a point to which the range data is shifted, corresponding points of the range data are calculated, and the correlation of the texture data is calculated on the basis of the calculated corresponding points. The minute shift of the range data, the corresponding point calculation processing, and the calculation of the correlation value of the texture data are repeatedly carried out for each minute shift of the range data. The corresponding point for the data exhibiting the highest texture correlation is outputted and the shift quantity of the range data is calculated on the basis of the outputted corresponding point.

20 Claims, 9 Drawing Sheets

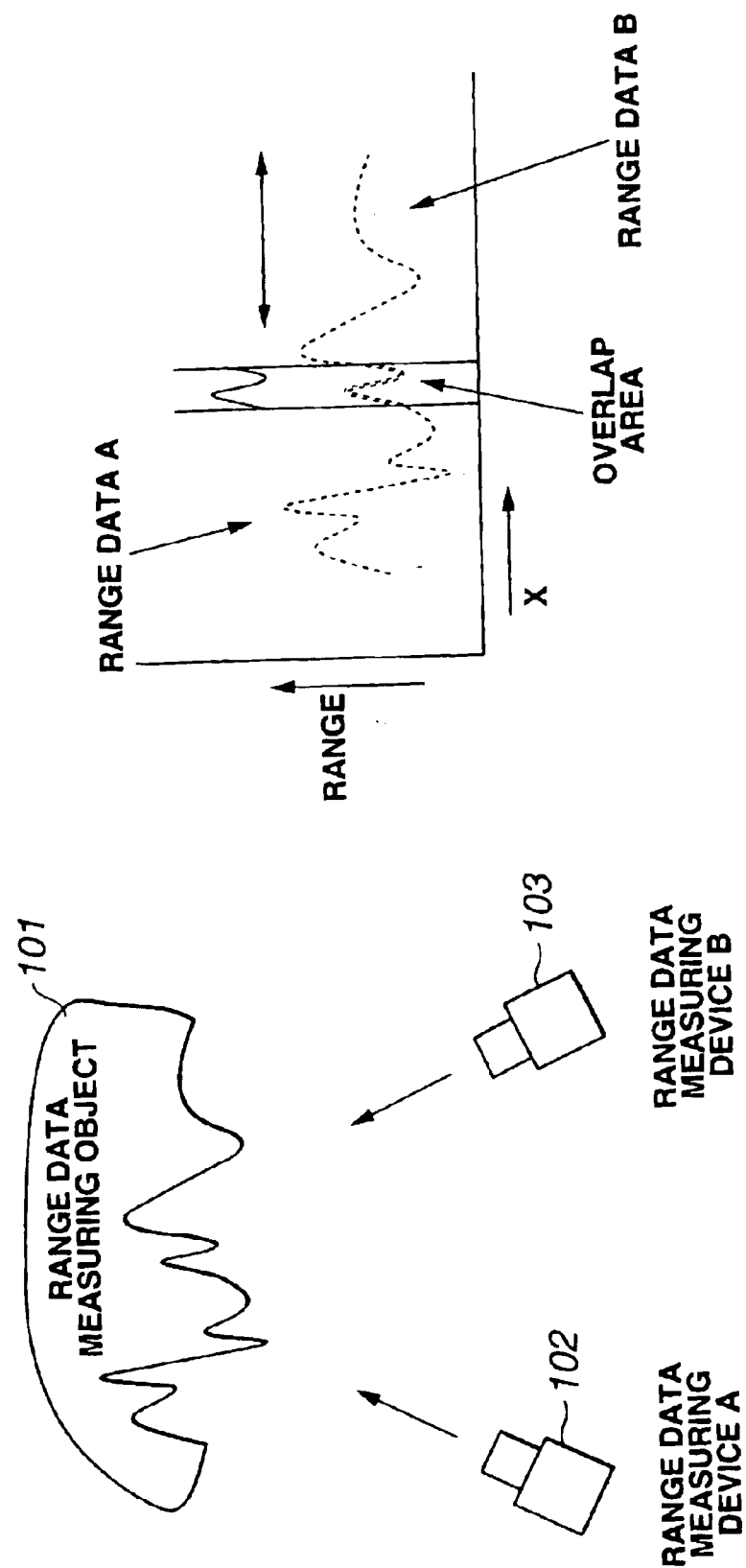

THREE-DIMENSIONAL DATA PROCESSING DEVICE, THREE-DIMENSIONAL DATA PROCESSING METHOD, AND PROGRAM PROVIDING MEDIUM

BACKGROUND OF THE INVENTION

This invention relates to a three-dimensional data processing device, a three-dimensional data processing method, and a program providing medium for finding a three-dimensional shape of an object. Particularly, this invention relates to a three-dimensional data processing device, a three-dimensional data processing method, and a program providing medium for finding a three-dimensional shape in which a target object is observed from a certain visual point to find distance data from the visual point and then a plurality of distance data from a plurality of different visual points are synthesized to calculate the three-dimensional shape of the whole target object.

There are several techniques for obtaining a three-dimensional shape of an object. The three-dimensional shape measuring methods are roughly classified into active visions and passive visions. The active visions are further classified into a laser technique for emitting a laser beam or an ultrasonic wave and measuring the quantity of reflected light from the object and the reaching time of the laser beam or ultrasonic wave to extract depth information, a pattern projection method for estimating the object shape from image information such as geometric deformation of the object surface pattern by using a special pattern light source such as a slit light, a method for forming contour lines using moire fringes by optical processing and thus obtaining three-dimensional information, and other methods. On the other hand, the passive visions are classified into a single-view stereoscopic vision for estimating three-dimensional information from one image, a stereo method for estimating depth information of each pixel using trigonometric principles, and other methods.

The distance information of the measuring object obtained by using the above-described laser technique or the stereo method is data indicating the surface shape of the measuring object and is called range data. The range data is aggregate data of distance data of measuring points at sample points obtained by using the laser technique or the stereo method.

Shooting data such as the color of the surface of the measuring object, similar to the data observed with the naked eye, is called texture data. The processing to correspond the range data to the texture data is referred to as texture mapping. By the texture mapping, a three-dimensional model of the measuring object is generated.

Generally, in one measurement, only the range data of the measuring object from one direction set as a measuring point is obtained. If a three-dimensional shape of the whole object is to be found, the processing to register and synthesize the range data from a plurality of measuring points is necessary. The same is true of the texture data.

To synthesize a plurality of range data, for example, the measuring object is set on a rotary table and a correspondence of the shooting direction to the rotation angle of the rotary table is made to obtain a plurality of range data. Thus, a plurality of range data or a plurality of texture data can be synthesized on the basis of the rotation angle of the rotary table. However, with respect to large objects that cannot be set on the rotary table, for example, a house, a building, a statue, natural features and the like, it is difficult to synthesize a plurality of range data by such a technique.

It is common to carry out the processing to set a measuring area so that each one of a plurality of range data has an overlap area with the other range data, and calculate the correlation of the distance data in the overlap area of the respective range data so as to find a position of high correlation as a position for synthesizing a plurality of range data. FIGS. 1A and 1B show an example of range data synthesis processing based on the correlation of range data.

It is assumed that registration and synthesis of range data from two measuring points of two range data measuring devices 102, 103 are carried out with respect to a measuring object 101 shown in FIG. 1A. The range data obtained by the range data measuring devices 102, 103 are shown in FIG. 1B. In FIG. 1B, to simplify the description, the range data is considered to be linear data extending on the X-axis cut on a certain plane. In this case, one of the range data is fixed and the other is shifted on the X-axis. Then, a point of the highest correlation in the overlap area of the two range data is found, thus carrying out the processing to register the two range data. In the case where the shape of the surface of the measuring object is characteristic, that is, uneven, as shown in FIGS. 1A and 1B, it is relatively easy to find the overlap area of the adjacent different range data from the correlation of the range data.

The registration algorithm in the overlap area of the different range data is carried out, for example, by the processing to find a corresponding position of the range data which minimizes the following equation (1).

$$\varepsilon^2 = \sum_i D(x(i), y(i))^2 = \sum_i \|(Rx(i) + t) - y(i)\|^2 \quad (1)$$

In this equation, x(i) and y(i) represent distance data values of range data x and range data y at a sample point (i). R represents a rotation matrix and t represents a translational vector. The processing to minimize the equation (1) is carried out by fixing one of the range data and changing the shift quantity R, t of the other range data. That is, the processing to calculate the shift quantity R, t for providing the minimum value of the equation (1) is carried out.

Many techniques of the range data registration processing are based on the algorithm developed by P. J. Besl (for example, P. J. Besl, N. D. Mckey, A Method of Registration of 3-D Shapes, IEEE Trans. Pattern Analysis and Machine Intelligence, Vol.14, No.2, 1992, pp.239–256). As an application of this algorithm, there is an example constructed by Z. Zhang (Z. Zhang, Iterative Point Matching for Registration of Free-form Curves and Surface, International Journal of Computer Vision, Vol. 13, No.2, 1994, pp. 119–152). This basic algorithm is called ICP (iterative closest point). According to ICP, the closest points of overlapping range data are used as corresponding points and the shift quantity R, t is repeatedly calculated to minimize in the above-described equation, thus carrying out registration between the range data. However, since this method is only applicable to range data having an overlap area and the closest points are simply determined as the corresponding points, erroneous correspondence easily occurs in the case of less characteristic shapes.

Moreover, the above-described method is adapted for registration between two adjacent range data. If the registration processing of three or more range data is sequentially carried out by using the above-described method, registration errors are sequentially propagated and accumulated at the terminal end. If an object is scanned from a plurality of directions to shoot (measure) range data of the whole object and registration of the range data is sequentially carried out, errors are accumulated, and in the worst case, the data might not be closed.

As a method for eliminating such problems, a technique of simultaneously registering a plurality of range data is considered. A typical technique is proposed by Neugebauter (Peter J. Neugebauter, Reconstruction of Real-World Objects Via Simultaneous Registration and Robust Combination of Multiple Range Images, International Journal of Shape Modeling, Vol.3, Nos.1&2, June 1997, pp.71–90). In this technique, the shift quantity R, t between the respective ranges is found so that errors in all the overlapping range data are reduced simultaneously. A corresponding point is considered to be a point where a straight line parallel to the shooting direction passing through a point on one range data intersects the other range data. In this technique, however, registration between the range data is carried out by using only the characteristics of the surface shape obtained from the range data. Therefore, in the case where an object, like a canister, which has a uniform surface and is difficult to register on the basis of the surface shape is used as a measuring object, registration between a plurality of range data is difficult.

For example, when range data of a measuring object 201 as shown in FIG. 2A are obtained from different measuring points and the registration processing of the range data is to be carried out on the basis of the correlation of distance information (surface shape) obtained from the range data, the surface of the measuring object has no characteristic unevenness and therefore the correlation value is hardly changed by shifting one of the range data, as shown in FIG. 2B. Therefore, it is difficult to carry out registration of the overlap area of the range data on the basis of the correlation of the range data and to calculate the accurate surface shape of the whole measuring object.

For registration of the entire circumference as a technique for compensating the difficulty in the above-described registration processing with the range data alone, a method using a boundary surface of the color of the texture is proposed (Tomoyuki Ishikawa, Masaki Otsuki, Yukio Sato, Integration of a Plurality of Range Data Using Color Boundary Portion, Computer Vision and Image Media 110–11, 1998, 3, 19). According to this method, when there is a clear difference (boundary) of color on the surface of an object, the corresponding point is corrected using the boundary as a clue. However, when there is no clear boundary on a measuring object, this method cannot be used.

SUMMARY OF THE INVENTION

In view of the foregoing status of the art, one advantage of the present invention is to provide a three-dimensional data processing device, a three-dimensional data processing method, and a program providing medium which enable the processing to accurately register range data even in the case of a measuring object for which the registration processing based on the correlation of range data is difficult.

An advantage of the present invention is to provide a three-dimensional data processing device, a three-dimensional data processing method, and a program providing medium which enable accurate registration even in the case of an object having no characteristics on its surface shape by generating a plurality of sets of range data and texture data from different visual points, then carrying out relative shift processing of range data having an overlap area, then calculating a corresponding point of the range data at the position to which the range data is minutely shifted, then calculating the correlation of the textures using the texture data, then repeating the minute shift of range data, the calculation of a corresponding point, and the calculation of a correlation value of the texture data at the calculated corresponding point, then outputting the point of the highest texture correlation as a corresponding point, and calculating the shift quantity of the range data on the basis of the outputted corresponding point.

According to an embodiment of the present invention, there is provided a three-dimensional data processing device for carrying out registration processing of a plurality of range data obtained at different measuring points with respect to a measuring object. The device has data input means for inputting a plurality of set data including range data and texture data measured at different measuring points with respect to the measuring object; corresponding point search means for setting a corresponding point of two set data having an overlap area, of the data inputted by the data input means, on the basis of the correlation of the two texture data of the two set data in the overlap area; and shift quantity calculating means for calculating the shift quantity of one of the range data for setting relative positions of the two range data which minimize an error in the overlap area of the two range data of the two set data, on the basis of the corresponding point set by the corresponding point search means.

According to another embodiment of the present invention, there is provided a three-dimensional data processing method for carrying out registration processing of a plurality of range data obtained at different measuring points with respect to a measuring object. The method has: a data input step of inputting a plurality of set data including range data and texture data measured at different measuring points with respect to the measuring object; a corresponding point search step of setting a corresponding point of two set data having an overlap area, of the data inputted at the data input step, on the basis of the correlation of the two texture data of the two set data in the overlap area; and a shift quantity calculating step of calculating the shift quantity of one of the range data for setting relative positions of the two range data which minimize an error in the overlap area of the two range data of the two set data, on the basis of the corresponding point set at the corresponding point search step.

According to another embodiment of the present invention, there is provided a program providing medium for providing a computer program which causes a computer system to carry out registration processing of a plurality of range data obtained at different measuring points with respect to a measuring object. The computer program has a data input step of inputting a plurality of set data including range data and texture data measured at different measuring points with respect to the measuring object; a corresponding point search step of setting a corresponding point of two set data having an overlap area, of the data inputted at the data input step, on the basis of the correlation of the two texture data of the two set data in the overlap area; and a shift quantity calculating step of calculating the shift quantity of one of the range data for setting relative positions of the two range data which minimize an error in the overlap area of the two range data of the two set data, on the basis of the corresponding point set at the corresponding point search step.

Additional features and advantages of the present invention are described in, and will be apparent from, the following Detailed Description of the Invention and the figures.

BRIEF DESCRIPTION OF THE FIGURES

FIGS. 1A and 1B illustrate a structure for obtaining range data of a measuring object and the correlation of the range data.

DETAILED DESCRIPTION OF THE INVENTION

Figures 2A, 2B:
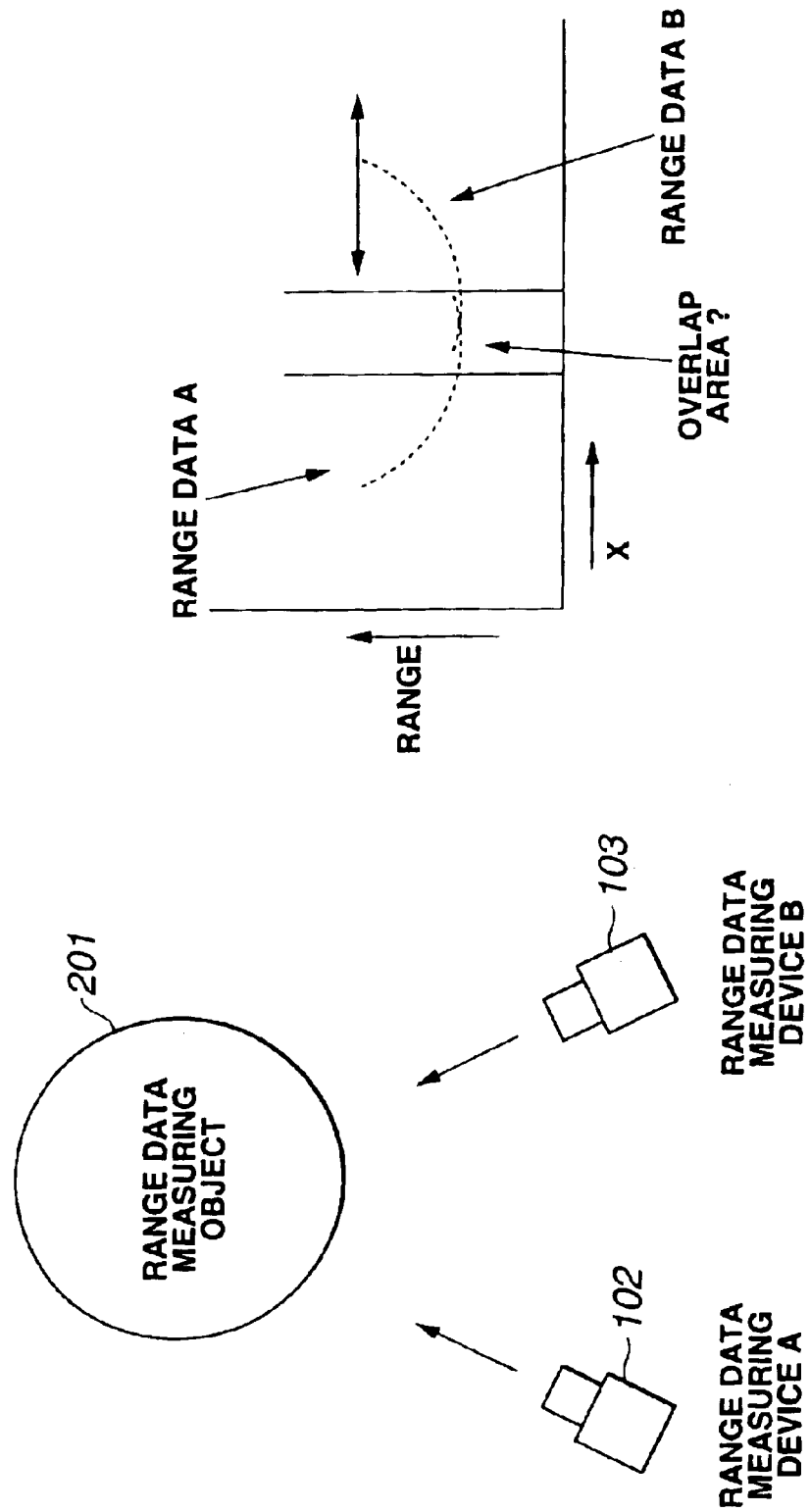
FIGS. 2A and 2B illustrate a structure for obtaining range data of a measuring object and an example in which registration based on the correlation of the range data is difficult.
Figure 3:
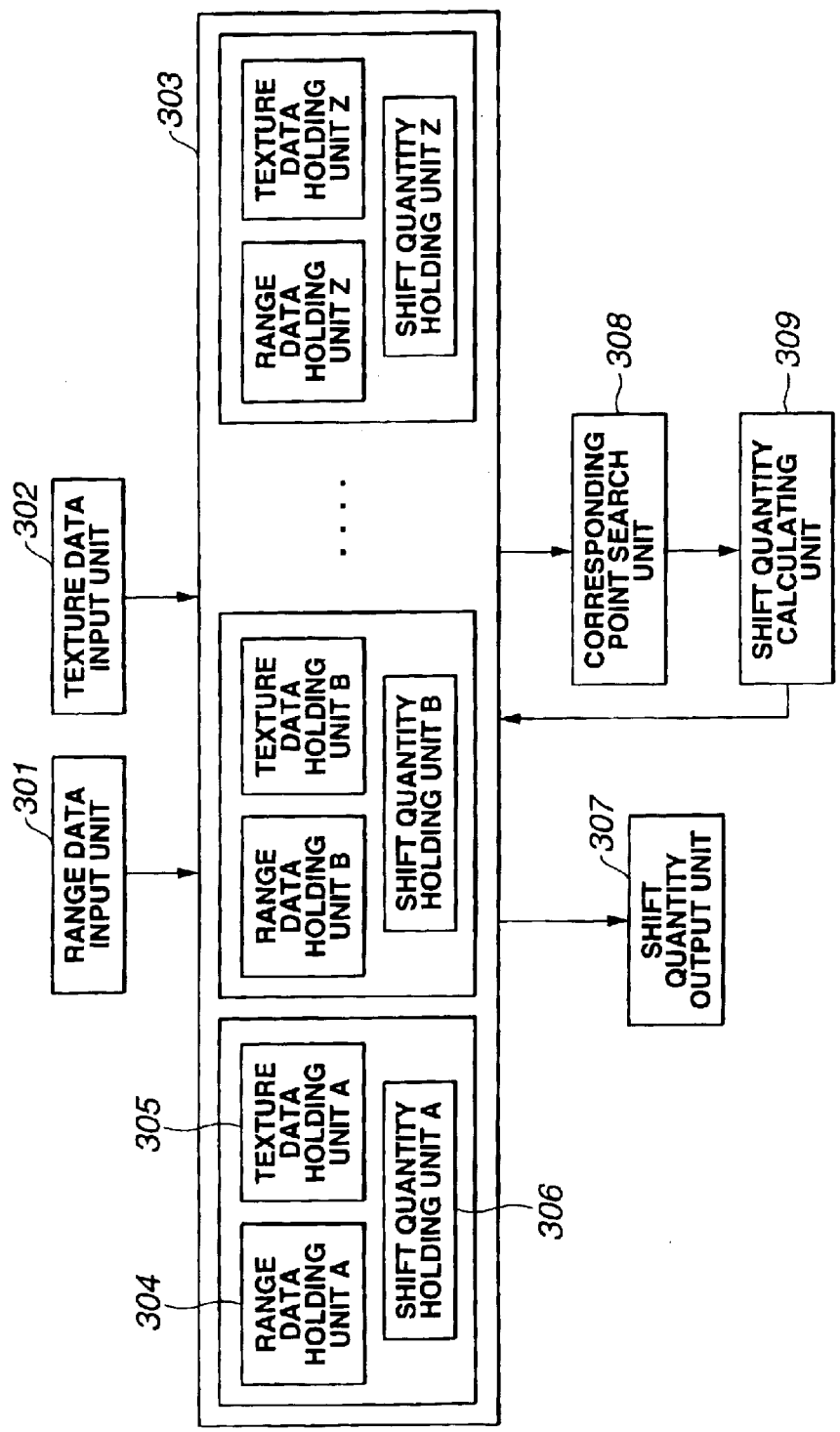
FIG. 3 is a block diagram showing a structure of a three-dimensional data processing device according to the present invention.

Preferred embodiments of the three-dimensional data processing device and the three-dimensional data processing method according to the present invention will now be described with reference to the drawings. FIG. 3 shows a block diagram of the structure for carrying out registration processing of range data in the three-dimensional data processing device of the present invention.

Figure 4:
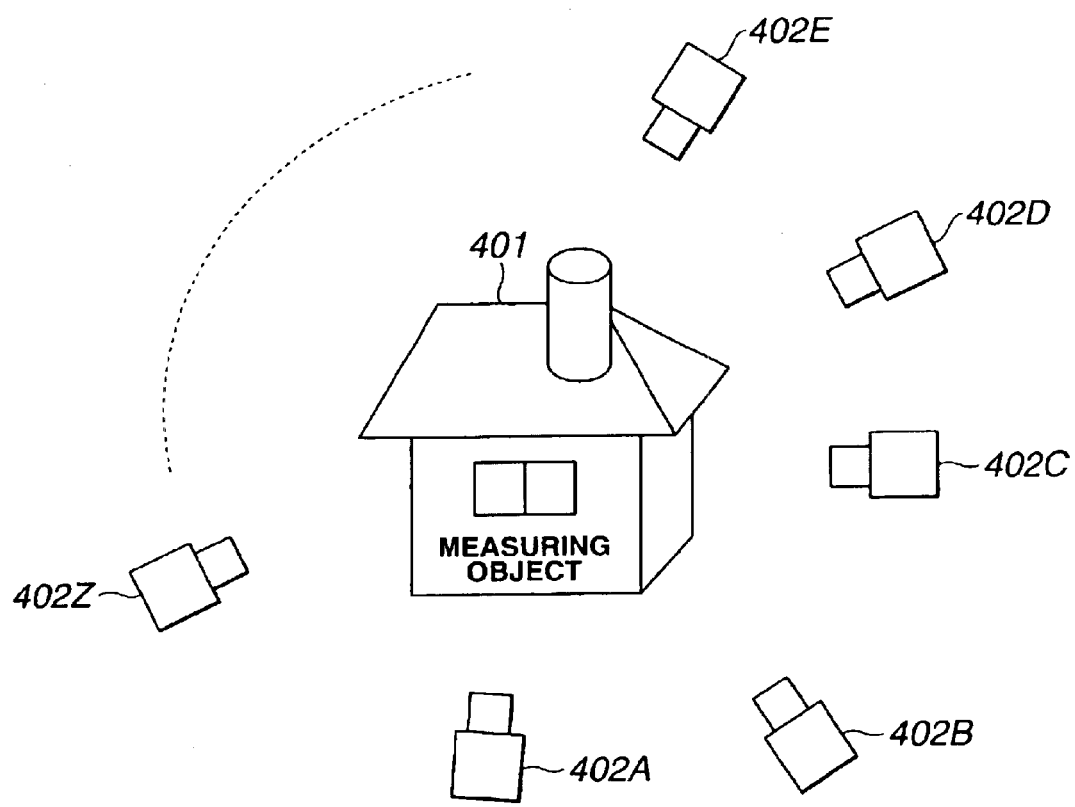
FIG. 4 illustrates a structure for obtaining range data and texture data in a three-dimensional data processing device according to the present invention.

A range data input unit 301 and a texture data input unit 302 input range data and texture data obtained from respective measuring points of a measuring object. For example, the range data input unit 301 and the texture data input unit 302 sequentially input range data and texture data obtained at measuring points 402A to 402Z for observing a measuring object 401 from different visual points, as shown in FIG. 4. The range data is distance information of the measuring object obtained by using the foregoing distance data obtaining technique such as a laser technique or a stereo technique. The texture data is data including luminance and color information of the surface of the measuring object obtained by an ordinary camera or the like.

Although in FIG. 4 measuring devices (image pickup means) are installed to surround the measuring object 401, this is simply an example. One or more measuring means may be installed to obtain data of a part of the measuring object. Alternatively, points for obtaining range data and texture data from above or below the measuring object 401 may be provided other than the measuring points shown in FIG. 4. Moreover, instead of setting multiple measuring points, the measuring object may be put on a table or the like and shifted relatively to the camera.

At each of the measuring points 402A to 402Z, range data and texture data of the measuring object 401 are obtained as a set of data from the same visual point. With respect to a set of range data and texture data belonging to one visual point, correspondence of data is made in a data obtaining area. The range data and texture data obtained from each of the measuring points 402A to 402Z set for the measuring object 401 have an overlap area with at least one of the measured data from other measuring points.

Referring again to FIG. 3, the function of each constituent part will be explained. Although the range data input unit 301 and the texture data input unit 302 are adapted for inputting the range data and texture data obtained at the respective measuring points as shown in FIG. 4, these input units are not limited to the structure for inputting data directly from the actual measuring means and may also have a structure for inputting the range data and texture data via storage means, such as a hard disk having the data stored thereon.

A data holding unit 303 stores the range data and texture data obtained at the respective measuring points and has a shift quantity holding unit for holding the shift quantity R, t of the range data for each measuring point. The shift quantity of the range data is expressed by a rotation matrix R and a translational vector t included in the following equation (2).

$$\varepsilon^2 = \sum_i D(x(i), y(i))^2 = \sum_i \|(Rx(i) + t) - y(i)\|^2 \qquad (2)$$

In this equation (2), x(i) and y(i) represent distance data values of range data x and range data y at a sample point (i). R represents a rotation matrix and t represents a translational vector. The registration processing is carried out as the processing to minimize the equation (2), that is, the processing to calculate the shift quantity R, t for providing the minimum value of in the equation (2).

For example, range data obtained at the measuring point A is stored in a range data holding unit 304A, and texture data obtained at the point A is stored in a texture data holding unit 305A. Moreover, the shift quantity R, t of the range data A calculated in the corresponding point search processing, which will be described later, is stored in a shift quantity holding unit A. Similarly, with respect to the measuring points B to Z, range data, texture data, and the shift quantity are stored in range data holding units B to Z, texture data holding units B to Z, and shift quantity holding units B to Z, respectively, provided in the data holding unit.

A corresponding point search unit 308 inputs range data and texture data of two data obtaining points having an overlap area, for example, data of the measuring point A and the measuring point B which are adjacent to each other, and carries out the registration processing of the overlap area to find corresponding points. The processing carried out by the corresponding point search unit will be later described in detail with reference to FIG. 5.

A shift quantity calculating unit 309 calculates the foregoing equation (2) on the basis of the corresponding points of the two range data having the overlap area searched for by the corresponding point search unit 308, and finds the shift quantity of one of the range data so as to minimize $\varepsilon$ in the foregoing equation (2). The shift quantity is the shift quantity R, t of the equation (2). For example, in the case of the range data A and the range data B, when the range data A is fixed and the range data B is shifted to find the shift quantity R, t which minimizes the value of the equation (2), the shift quantity R, t thus found is stored in the shift quantity holding unit B.

The corresponding point search unit 308 inputs the two data having the overlap area for registration and finds the respective corresponding points, and the shift quantity calculating unit 309 carries out the processing to find the shift quantity R, t which minimizes $\varepsilon$ in the equation (2) on the basis of each set of data. The shift quantity calculating unit 309 may also be constituted to calculate the shift quantity for each one set of two range data. Alternatively, the shift quantity calculating unit 309 may input three or more range data, then find ϵ[A, B], ϵ[B, C], . . . of sets of range data [A, B], [B, C], . . . having an overlap area in accordance with the equation (2), and then find the shift quantity R, t for the respective sets of range data so as to simultaneously reduce errors in the all the overlapping range data, for example, by using the technique proposed by Neugebauter (Peter J. Neugebauter, Reconstruction of Real-World Objects Via Simultaneous Registration and Robust Combination of Multiple Range Images, International Journal of Shape Modeling, Vol.3, Nos.1&2, June 1997, pp.71–90).

A shift quantity output unit 307 outputs the values of the shift quantity holding units A to Z which holds the value calculated by the shift quantity calculating unit 309. The positions of the range data are determined on the basis of the outputted shift quantity. Distance data, for example, on the entire circumference of the measuring object, is constituted and the texture data is pasted thereto, thus generating a three-dimensional image of the measuring object.

Figure 5:
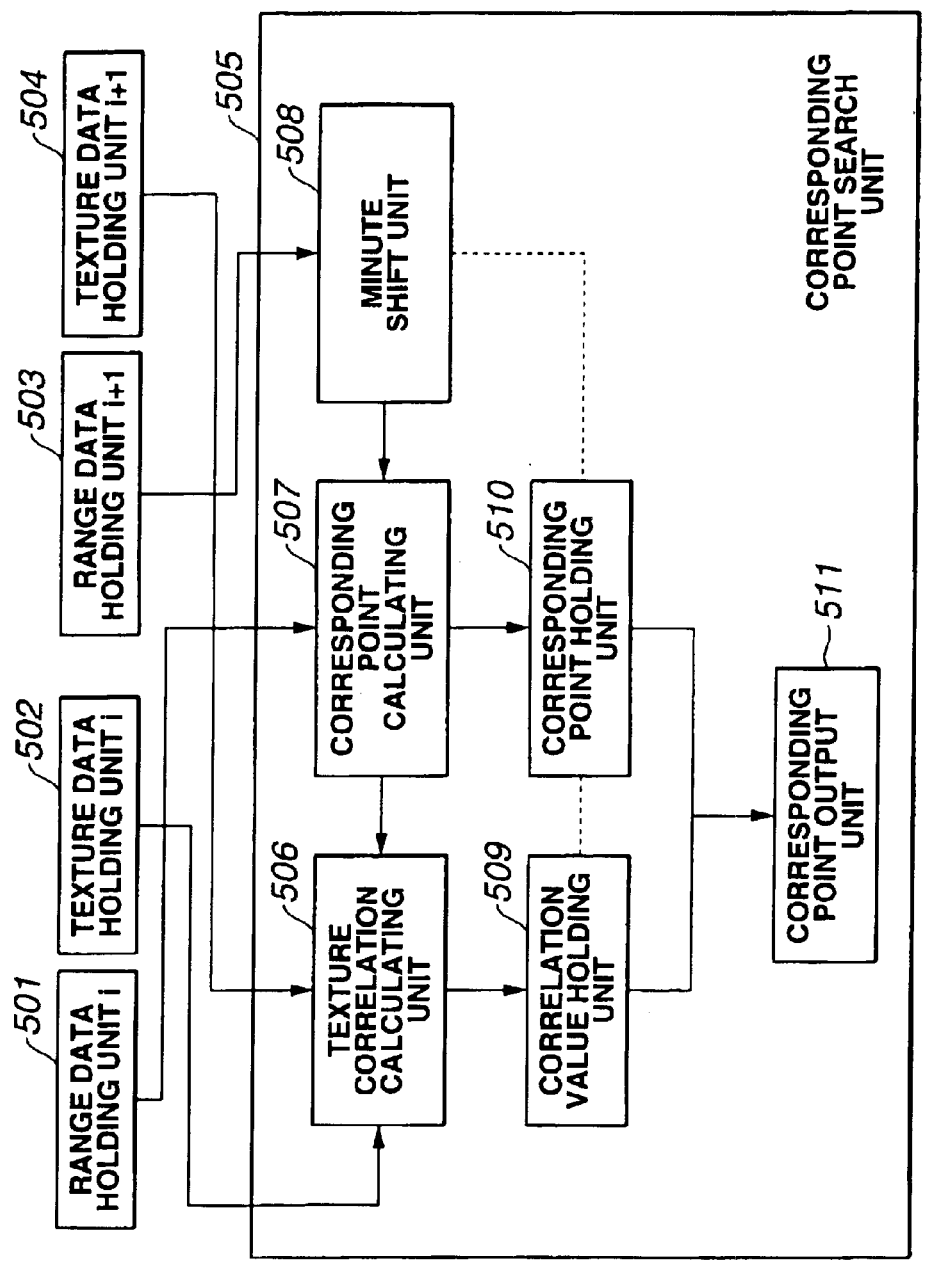
FIG. 5 illustrates a detailed structure of a corresponding point search unit in a three-dimensional data processing device according to the present invention.

FIG. 5 shows the detailed structure of the corresponding point search unit. To a corresponding point search unit 505 shown in FIG. 5, two range data and two texture data having an overlap area, obtained from two different measuring points, are inputted. In this case, the input data is referred to as range data i stored in a range data holding unit i 501, texture data i stored in a texture data holding unit i 502, range data i+1 stored in a range data holding unit i+1 503, and texture data i+1 stored in a texture data holding unit i+1 504.

The range data i stored in the range data holding unit i 501 and the range data i+1 stored in the range data holding unit i+1 503 are inputted to a minute shift unit 508 of the corresponding point search unit 505. For the range data having an overlap area, the initial relative positions are approximately set from the measuring point positions, and the minute shift unit 508 carries out relative shift processing of the range data from the initially set positions in accordance with a plurality of predetermined shift variations. At the points to which the range data are minutely shifted, a corresponding point calculating unit 507 calculates corresponding points of the range data with respect to each other, and on the basis of the corresponding points thus set, a texture correlation calculating unit 506 calculates the correlation of the texture data which are similarly caused to correspond to each other. The correlation calculated by the texture correlation calculating unit 506 is held in a correlation value holding unit 509 and the corresponding points corresponding to the correlation value are held in a corresponding point holding unit 510.

The minute shift by the minute shift unit 508, the corresponding point calculation processing by the corresponding point calculating unit 507, and the calculation of the correlation value of the texture data by the texture correlation calculating unit 506 are repeatedly carried out for each of the various minute shifts in accordance with the plurality of shift variations carried out by the minute shift unit 508. The corresponding point having the highest correlation value, of the texture correlation values calculated on the basis of the different corresponding points, is outputted from a corresponding point output unit 511.

Figure 6:
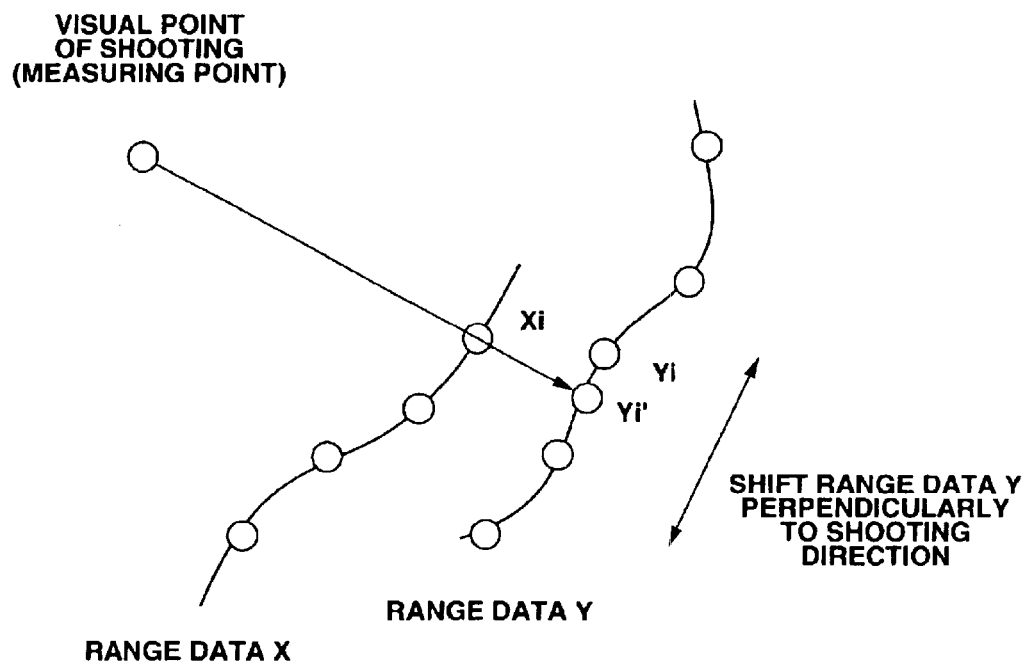
FIG. 6 illustrates an example of corresponding point setting processing in a three-dimensional data processing device according to the present invention.

The above-described processing will now be described further in detail with reference to FIG. 6. Referring to FIG. 6, the corresponding point setting processing using two range data X, Y and two texture data X, Y obtained from adjacent measuring points X, Y having an overlap area will be explained. The range data X, Y are aggregates of sample points Xi, Yi. These range data may also be considered as aggregate of triangular meshes set by connecting adjacent sample points. The texture data X is caused to correspond to the range data X, and the texture data Y is caused to correspond to the range data Y.

First, when the range data X and the range data Y are inputted to the minute shift unit 508, the range data Y is minutely shifted in accordance with a predetermined shift variation. In the example of FIG. 6, the processing to shift the range data Y by a predetermined distance in a direction perpendicular to the visual point of shooting (measuring point) is carried out as one shift variation. It is assumed that at the positions shown in FIG. 6, the relative positions of the range data X and Y based on one shift variation are set.

Next, the corresponding point calculating unit 507 determines, as Yi', a point of intersection made by the range data Y and a line extending from a line connecting the sample point Xi of the range data X with the visual point of shooting (measuring point), and sets these points Xi and Yi' as corresponding points at the positions in this shift variation. The positions of the corresponding points thus set are held in corresponding point holding unit 510.

The texture correlation calculating unit 506 calculates the correlation in the overlap area of the texture data X and the texture data Y' at these positions. The color value of RGB or the luminance value of the texture data is calculated at each coordinate position, and the correlation is calculated in accordance with the following equation (3), in which x(i) represents the luminance value or the RGB color value at each coordinate (i) of the texture data X, and y'(i) represents the luminance value or the RGB color value at each coordinate (i) of the texture data Y'.

$$r = \frac{\sum_i (Tx(x_i) - \overline{Tx})(Ty(y_i') - \overline{Ty})}{\sqrt{\sum_i (Tx(x_i) - \overline{Tx})^2} \sqrt{\sum_i (Ty(y_i') - \overline{Ty})^2}} \quad (3)$$

In this equation (3), Tx is an average of Tx(xi) and Ty is an average of Ty(y'i)

In the equation (3), the value of r is closer to 1 for higher correlation between the texture data X and the texture data Y'. The value of r is 0 when there is no correlation. The value of r is closer to −1 for higher inverse correlation. The correlation value r found in the equation (3) is held in the correlation value holding unit 509.

Corresponding points y''', y''', y'''', . . . are newly set in accordance with different shift variations. The corresponding point positions are stored in the corresponding holding unit 510 and the correlation values are calculated in accordance with the equation (3) by the texture correlation calculating unit. The calculated correlation values are held in the correlation value holding unit 509. The corresponding points stored in the corresponding point holding unit 510 and the correlation values held in the correlation value holding unit 509 are caused to correspond to each other.

When a plurality of times of shift processing based on the predetermined shift variations are completed and the processing to calculate all the corresponding points and correlation values is completed, the corresponding point position where the highest correlation of the calculated correlation values is obtained is outputted from the corresponding point output unit 511.

Corresponding point information set on the basis of the correlation of the texture data, outputted from the corresponding point output unit, is outputted to the shift quantity calculating unit 309 of FIG. 3. The shift quantity calculating unit 309 carries out the processing to find the shift quantity R, t which minimizes ϵ in accordance with the equation (2) with respect to the range data X and Y, on the basis of the set corresponding point. When the shift quantity R, t which minimizes ϵ is found, the shift quantity data is stored in the shift quantity holding unit Y of the range data Y (in the case where the range data X is fixed and the range data Y is shifted). On the basis of the shift quantity thus determined, the relative positions of the plurality of range data are determined. Then, distance data, for example, on the entire circumference of the measuring object, is constituted and the texture data is pasted thereto, thus generating a three-dimensional image of the measuring object.

Figure 7:
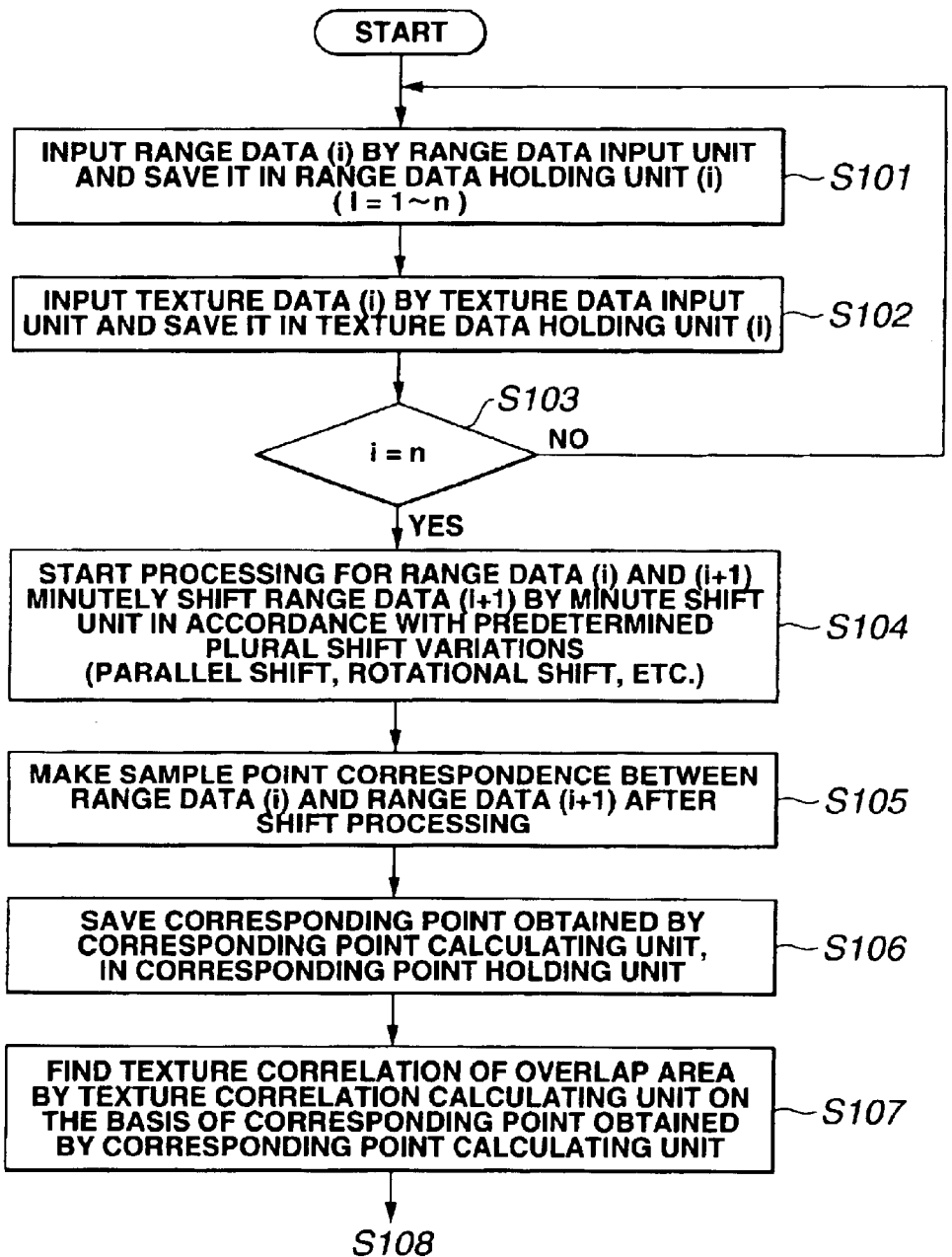
FIG. 7 shows a processing flow (part one) in a three-dimensional data processing device according to the present invention.
Figure 8:
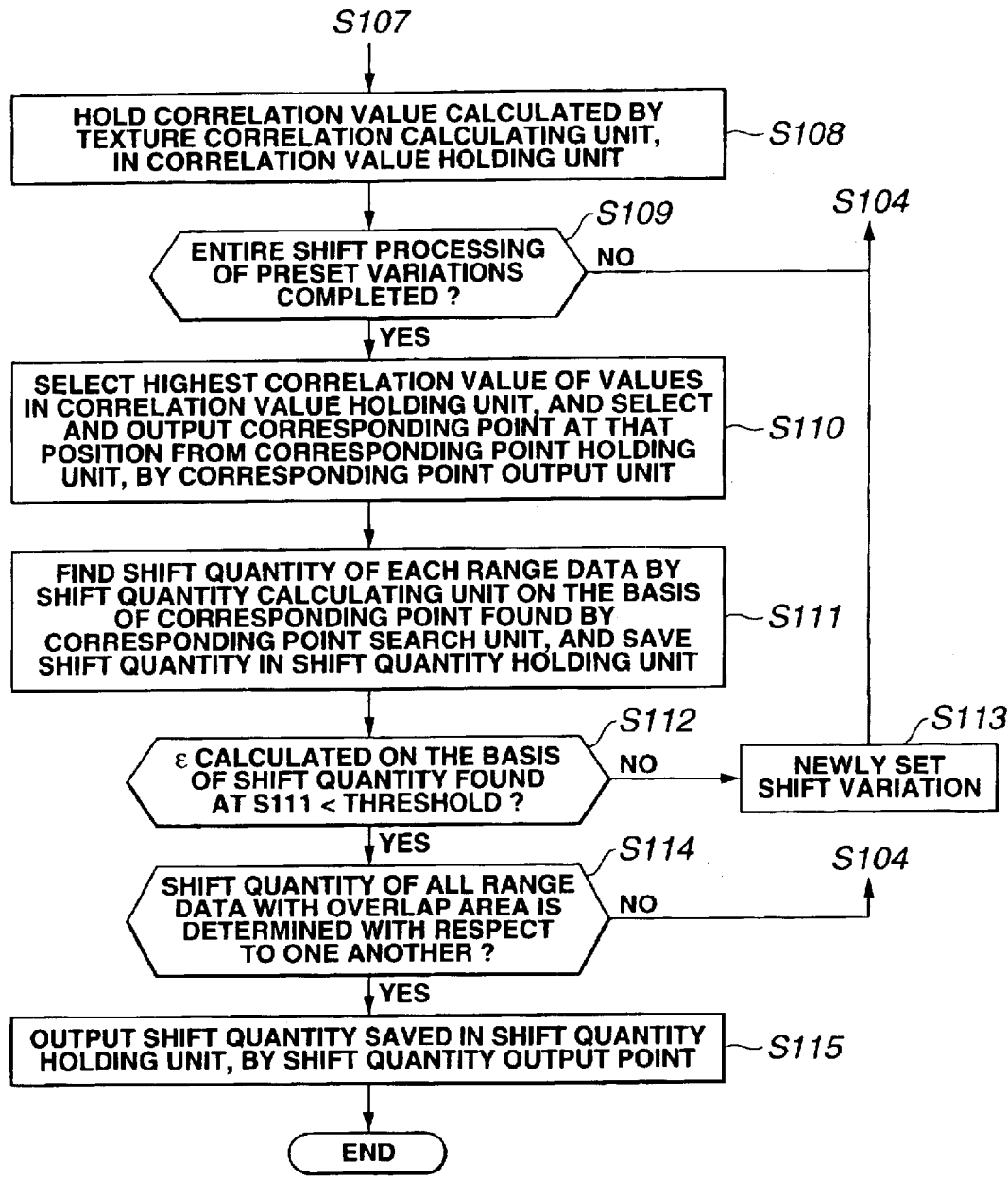
FIG. 8 shows a processing flow (part two) in a three-dimensional data processing device according to the present invention.

Steps of the shift quantity setting processing which accompanies the setting of corresponding points based on texture data, carried out in the three-dimensional data processing method of the present invention, will now be described with reference to FIGS. 7 and 8.

First, at step S101, range data (i) is inputted and held in the range data holding unit (i). At step S102, texture data (i) is inputted and stored in the texture data holding unit (i). In this case, i=1 to n and n corresponds to the number of measuring points. The data input processing is repeatedly carried out for the total number of measuring points n (S103).

On completion of the input of all the range data and texture data, the processing of step S104 and the subsequent steps are carried out. In the following now, the processing of two adjacent data (i) and data (i+1) of measuring points i and i+1 is carried out. Step S104 is the processing carried out by the minute shift unit 508. The range data (i+1) is minutely shifted in accordance with one of a plurality of predetermined shift variations (parallel shift, rotational shift, etc.)

Step S105 is the processing carried out by the corresponding point calculating unit 507. The sample point correspondence is made between the range data (i) and the range data (i+1) after the shift processing. This processing is, for example, the processing described with reference to FIG. 6. Step S106 is the processing to save the corresponding points obtained by the corresponding point calculating unit 507, into the corresponding point holding unit 510.

Step S107 is the processing carried out by the texture correlation calculating unit 506. The texture correlation in the overlap area is calculated on the basis of the corresponding points obtained by the corresponding point calculating unit 507. This is carried out, for example, in accordance with the equation (3). Step S108 is the processing to hold the correlation value calculated by the texture correlation calculating unit 506, in the correlation value holding unit 509.

At step S109, it is determined whether the shifts of all the preset variations are completed or not. If not, the processing of steps S104 to S108 is repeatedly carried out. If the shifts of all the preset variations are completed, the processing goes to step S110.

At step S110, the corresponding point output unit 511 selects the highest correlation value of the values held in the correlation value holding unit, and selects and outputs the corresponding point at that position from the corresponding point holding unit 510.

The next step S111 is the processing carried out by the shift quantity calculating unit 309 (FIG. 3). The shift quantity of each range data is found on the basis of the corresponding point found and outputted by the corresponding point search unit. The shift quantity is saved in the shift quantity holding unit. The shift quantity is R, t in the foregoing equation (2).

The next steps S112 and S113 are steps of comparing the value calculated on the basis of the shift quantity R, t found at step S111, with a predetermined threshold value. If the calculated value is smaller than the threshold value, it is determined that the shift quantity based on the correct corresponding point position is calculated, and the processing goes to step S114. On the other hand, if the value calculated on the basis of the shift quantity R, t found at step S111 is not smaller than the threshold value, it is determined that a shift quantity based on an erroneous corresponding point position is calculated. Thus, a new shift variation is set at step S113 and the processing of step S104 and the subsequent steps is repeated on the basis of the new shift variation.

At step S114, it is discriminated whether the shift quantities of all the range data having an overlap area with respect to each other are determined or not. If there is any unprocessed data, the processing returns to step S104 and the setting and processing of a new set of data having an overlap are carried out.

On completion of the processing of all the data, at step S115, the shift quantity held in the shift quantity holding unit is outputted from the shift quantity output unit 307. The relative positions of the plurality of range data are determined on the basis of the outputted shift quantity. Distance data, for example, on the entire circumference of the measuring object, is constituted and texture data is pasted thereto, thus generating a three-dimensional image of the measuring object.

Figure 9:
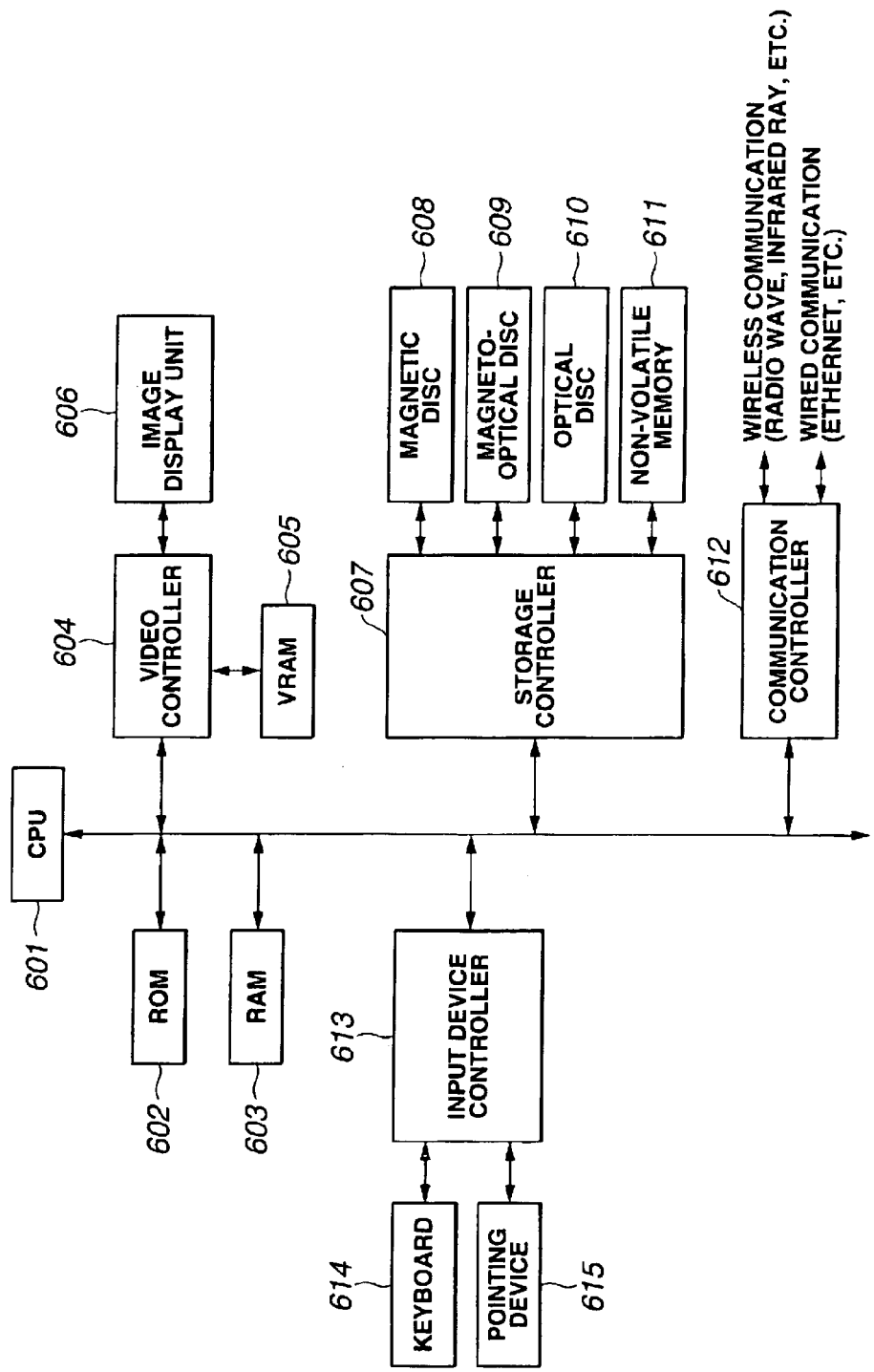
FIG. 9 shows an exemplary hardware structure of a three-dimensional data processing device according to the present invention.

The hardware structure of the three-dimensional data processing device of the present invention will now be described with reference to FIG. 9. A CPU (central processing unit) 601 for executing various processing programs controls the processing of each constituent part of FIG. 9. A ROM (read only memory) 602 is a memory in which an IPL (initial program loading) program or the like is stored. A RAM (random access memory) 603 is used as a work area for the program and processing executed by the CPU 601.

A video controller 604, under the control of the CPU 601, controls the display of an image display unit 606 as a monitor by using a VRAM (video RAM) 605. The VRAM 605 temporarily stores data to be displayed by the image display 606, for example, three-dimensional model data obtained by pasting texture data to range data. Specifically, the display data is once written into the VRAM 605 via the video controller 604 and the data stored in the VRAM 605 is read out and supplied to the image display unit 606 by the video controller 604, thus displaying the image.

A storage controller 607 has a function to control access to a magnetic disk 608 such as HD (hard disk) or FD (floppy disk), a magneto-optical disc 609 such as mini disc, an optical disc 610 such as CD-ROM (compact disc ROM), and a non-volatile memory 611 such as ROM or flash memory. The magnetic disk 608, the magneto-optical disc 609, the optical disc 610 and the non-volatile memory 611 store data, for example, the above-described range data and texture data, or various data such as three-dimensional data obtained by pasting texture data to range data. The stored data are read out by the CPU 601 via the storage controller 607. The programs to be executed by the CPU 601 may be stored in various storage media. For example, the programs for the various processing in the flow of FIGS. 7 and 8 such as the corresponding point search processing and the correlation calculation processing can be stored in a storage medium such as a magnetic disk.

A communication controller 612 controls wireless communication using radio waves and infrared rays, and wired communication using the Ethernet and the like. For example, various measuring data such as range data and texture data, and various processing programs to be executed by the CPU 601 can also be obtained from an external device by communicating via the communication controller 612.

An input device controller 613 controls a keyboard 614 and a pointing device 615 made up of a mouse or the like, and outputs commands and data input from the various input devices to the CPU 601.

The present invention is described above in detail with reference to specific embodiments. However, it is obvious that any skilled person in the art may effect modifications and alternatives without departing from the scope of the present invention. The present invention is disclosed above by using the embodiments as illustrative examples and it should be understood that the present invention is not limited to the embodiments. Any appropriate combination of the above-described embodiments is included in the scope of the present invention. The attached claims should be considered to define the scope of the present invention.

As described above in detail, according to the three-dimensional data processing device and the three-dimensional data processing method of the present invention, since a corresponding point is set with a high accuracy on the basis of texture data even in the case of a measuring object for which registration processing based on the correlation of range data is difficult, registration of range data of an object having no characteristics on its surface shape can be accurately carried out and generation of a three-dimensional model with a high accuracy is made possible.

Moreover, the three-dimensional data processing device and the three-dimensional data processing method of the present invention employ the structure for generating sets of range data and texture data from different visual points, then carrying out relative shift processing of the range data, then calculating corresponding points of the range data with respect to each other at each minute shift point, then calculating the correlation of the texture data on the basis of the calculated corresponding points, then outputting the corresponding point for the data exhibiting the highest correlation, and calculating the shift quantity of the range data on the basis of the outputted corresponding point. Therefore, accurate registration of range data of an object having no characteristics on its surface shape and generation of a three-dimensional model with a high accuracy are made possible.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A three-dimensional data processing device for carrying out registration processing of a plurality of range data obtained at different measuring points with respect to a measuring object, the device comprising:

data input means for inputting a plurality of set data including range data and texture data measured at different measuring points with respect to the measuring object;

corresponding point search means for setting a corresponding point of two set data having an overlap area, of the data inputted by the data input means, on the basis of a correlation of two texture data of the two set data in the overlap area; and shift quantity calculating means for calculating a shift quantity of one of the range data for setting relative positions of two range data which minimize an error in the overlap area of the two range data of the two set data, on the basis of the corresponding point set by the corresponding point search means.

2. The three-dimensional data processing device as claimed in claim 1, wherein the corresponding point search means comprises:

minute shift means for shifting one of the two range data included in the two sets of data having the overlap area, to a plurality of different relative positions with respect to the other range data;

corresponding point calculating means for setting corresponding points between the two range data in accordance with respective positions of the plurality of different relative positions;

texture correlation calculating means for calculating a correlation of two texture data in an overlap area of two sets of data determined on the basis of the corresponding points set by the corresponding point calculating means; and corresponding point output means for outputting two range data corresponding points with respect to a set of two texture data having a highest correlation calculated by the texture correlation calculating means, as output corresponding points.

3. The three-dimensional data processing device as claimed in claim 1, wherein the corresponding point search means has texture correlation calculating means for calculating a correlation of two texture data having an overlap area; and wherein the correlation calculated by the texture correlation calculating means is based on either luminance values or color values of the two range data.

4. The three-dimensional data processing device as claimed in claim 1, wherein the shift quantity calculated by the shift quantity calculating means is calculated as a set of a rotation matrix R and a translational vector t indicating the shift quantity of one of the range data.

5. The three-dimensional data processing device as claimed in claim 1, wherein the shift quantity calculating means has a structure for inputting three or more range data and calculating the shift quantities of respective sets of range data so that errors in all the overlapping range data are simultaneously reduced.

6. A three-dimensional data processing method for carrying out registration processing of a plurality of range data obtained at different measuring points with respect to a measuring object, the method comprising the steps of:

a data input step of inputting a plurality of set data comprising range data and texture data measured at different measuring points with respect to the measuring object;

a corresponding point search step of setting a corresponding point of two set data having an overlap area, of the data inputted at the data input step, on the basis of a correlation of two texture data of two set data in the overlap area; and a shift quantity calculating step of calculating a shift quantity of one of the range data for setting relative positions of two range data which minimize an error in the overlap area of the two range data of the two set data, on the basis of the corresponding point set at the corresponding point search step.

7. The three-dimensional data processing method as claimed in claim 6, wherein the corresponding point search step comprises the steps of:
 a minute shift step of shifting one of the two range data of the two sets of data having the overlap area, to a plurality of different relative positions with respect to the other range data;
 a corresponding point calculating step of setting corresponding points between the two range data in accordance with respective positions of the plurality of different relative positions;
 a texture correlation calculating step of calculating a correlation of two texture data in an overlap area of two sets of data determined on the basis of the corresponding points set at the corresponding point calculating step; and
 a corresponding point output step of outputting two range data corresponding points with respect to a set of two texture data having a highest correlation calculated at the texture correlation calculating step, as output corresponding points.

8. The three-dimensional data processing method as claimed in claim 6, wherein the corresponding point search step has a texture correlation calculating step of calculating the correlation of two texture data having an overlap area, and wherein the correlation calculated at the texture correlation calculating step is based on either luminance values or color values of the two range data.

9. The three-dimensional data processing method as claimed in claim 6, wherein the shift quantity calculated at the shift quantity calculating step is calculated as a set of a rotation matrix R and a translational vector t indicating the shift quantity of one of the range data.

10. The three-dimensional data processing method as claimed in claim 6, wherein the shift quantity calculating step is a step of inputting three or more range data and calculating the shift quantities of respective sets of range data so that errors in all the overlapping range data are simultaneously reduced.

11. A computer readable medium for providing a computer program which causes a computer system to carry out registration processing of a plurality of range data obtained at different measuring points with respect to a measuring object, the computer program comprising:
 a data input step of inputting a plurality of set data comprising range data and texture data measured at different measuring points with respect to the measuring object;
 a corresponding point search step of setting a corresponding point of two set data having an overlap area, of the data inputted at the data input step, on the basis of a correlation of the two texture data of two set data in the overlap area; and
 a shift quantity calculating step of calculating a shift quantity of one of the range data for setting relative positions of two range data which minimize an error in the overlap area of the two range data of the two set data, on the basis of the corresponding point set at the corresponding point search step.

12. The computer readable medium as claimed in claim 11, wherein the corresponding point search step comprises:
 a minute shift step of shifting one of the two range data of the two sets of data having the overlap area, to a plurality of different relative positions with respect to the other range data;
 a corresponding point calculating step of setting corresponding points between the two range data in accordance with respective positions of the plurality of different relative positions;
 a texture correlation calculating step of calculating correlation of two texture data in an overlap area of two sets of data determined on the basis of the corresponding points set at the corresponding point calculating step; and
 a corresponding point output step of outputting two range data corresponding points with respect to a set of two texture data having a highest correlation calculated at the texture correlation calculating step, as output corresponding points.

13. The computer readable medium as claimed in claim 11, wherein the corresponding point search step has a texture correlation calculating step of calculating the correlation of two texture data having an overlap area, and wherein the correlation calculated at the texture correlation calculating step is based on either luminance values or color values of the two range data.

14. The computer readable medium as claimed in claim 11, wherein the shift quantity calculated at the shift quantity calculating step is calculated as a set of a rotation matrix R and a translational vector t indicating the shift quantity of one of the range data.

15. The computer readable medium as claimed in claim 11, wherein the shift quantity calculating step is a step of inputting three or more range data and calculating the shift quantities of respective sets of range data so that errors in all the overlapping range data are simultaneously reduced.

16. A three-dimensional data processing device for processing a plurality of sets of data, having range data and texture data, of an object obtained at different measuring points, two sets of data of two adjacent measuring points having an overlap area, the device comprising:
 a data input unit which inputs the plurality of sets of data;
 a data holding unit linked to the data input unit and having a storage of the plurality of sets of data input by the data input unit;
 a corresponding point search unit linked to the data holding unit and having an identified corresponding point of the two sets of data of two adjacent measuring points on the basis of a correlation of the texture data of the two sets of data in the overlap area; and
 a shift quantity calculating unit linked to at least one of the data holding unit and the corresponding point search unit and having a calculated shift quantity of one of the range data of the two sets of data which sets relative positions of the two range data of the two sets of data which minimize an error in the overlap area of the two range data of the two sets of data on the basis of the corresponding point identified by the corresponding point search unit.

17. The three-dimensional data processing device as claimed in claim 16, wherein the corresponding point search unit further comprises:
 a minute shift unit which defines shifts of one of the two range data of the two sets of data having the overlap area to a plurality of different relative positions with respect to the other of the two range data;
 a corresponding point calculating unit linked to the minute shift unit and which sets corresponding points between the two range data in accordance with respective positions of the plurality of different relative positions;

a texture correlation calculating unit linked to the corresponding point calculating unit and having a calculated correlation of the two texture data in the overlap area of the two sets of data determined on the basis of the corresponding points set by the corresponding point calculating unit; and a corresponding point output unit having an output of two range data corresponding points with respect to the two texture data of the two sets of data, the two range data corresponding points having a highest correlation calculated by the texture correlation calculating unit.

18. The three-dimensional data processing device as claimed in claim 16, wherein the corresponding point search unit further comprises a texture correlation calculating unit having a calculated correlation of the texture data of the two sets of data, and wherein the calculated correlation is based on one of luminance values or color values of the range data of the two sets of data.

19. The three-dimensional data processing device as claimed in claim 16, wherein the shift quantity calculated by the shift quantity calculating unit is calculated as a set of a rotation matrix R and a translational vector t indicating the shift quantity of one of the range data of the two sets of data.

20. The three-dimensional data processing device as claimed in claim 16, wherein the shift quantity calculating unit further comprises a structure of inputting three or more range data and calculating the shift quantities of respective sets of range data so that errors in all the overlapping range data are simultaneously reduced.

* * * * *